United States Patent
Herbert (10) Patent No.: US 6,707,931 B2
(45) Date of Patent: Mar. 16, 2004

(54) REMOTE PRINT PRESS PROOFING SYSTEM

(75) Inventor: Franz H. Herbert, Encinatas, CA (US)

(73) Assignee: Integrated Color Solutions, Inc., Greenville, SC (US)

( * ) Notice: Subject to any disclaimer, the term of this patent is extended or adjusted under 35 U.S.C. 154(b) by 0 days.

(21) Appl. No.: 10/133,185

(22) Filed: Apr. 26, 2002

(65) Prior Publication Data

US 2003/0007191 A1 Jan. 9, 2003

Related U.S. Application Data

(63) Continuation-in-part of application No. 09/726,922, filed on Nov. 30, 2000, now Pat. No. 6,381,343.
(60) Provisional application No. 60/195,688, filed on Apr. 7, 2000.

(51) Int. Cl.[7] .................................................. G06K 4/00
(52) U.S. Cl. ........................................ 382/112; 345/744
(58) Field of Search ................................. 382/100, 112, 382/162, 167, 232; 348/14.01, 211.3; 345/744, 746, 747; 725/4, 82

(56) References Cited

U.S. PATENT DOCUMENTS

| | | | |
|---|---|---|---|
| 4,561,103 A | 12/1985 | Horiguchi et al. | 382/112 |
| 5,309,257 A * | 5/1994 | Bonino et al. | 358/504 |
| 5,384,859 A | 1/1995 | Bolza-Schunemann et al. | 382/112 |
| 5,384,901 A * | 1/1995 | Glassner et al. | 345/591 |
| 5,579,031 A * | 11/1996 | Liang | 345/604 |
| 5,625,766 A | 4/1997 | Kauffman | 382/294 |
| 5,652,849 A | 7/1997 | Conway et al. | 345/719 |
| 5,721,811 A | 2/1998 | Eckhardt et al. | 358/1.9 |
| 5,767,980 A | 6/1998 | Wang et al. | 358/475 |
| 5,799,219 A | 8/1998 | Moghadam et al. | 396/319 |
| 5,828,780 A * | 10/1998 | Suzuki et al. | 382/167 |
| 5,844,542 A * | 12/1998 | Inoue et al. | 345/594 |
| 5,864,387 A | 1/1999 | Reed et al. | 355/40 |
| 5,923,446 A * | 7/1999 | Nakagiri | 358/520 |
| 5,983,369 A * | 11/1999 | Bakoglu et al. | 714/46 |
| 5,987,165 A * | 11/1999 | Matsuzaki et al. | 382/162 |
| 6,014,183 A | 1/2000 | Hoang | 348/702 |
| 6,017,157 A | 1/2000 | Garfinkle et al. | 396/639 |
| 6,167,442 A * | 12/2000 | Sutherland et al. | 709/217 |
| 6,252,676 B1 * | 6/2001 | Azima et al. | 358/1.9 |
| 6,268,930 B1 * | 7/2001 | Ohta et al. | 358/1.9 |
| 6,449,639 B1 * | 9/2002 | Blumberg | 709/217 |
| 6,516,089 B1 * | 2/2003 | McCann et al. | 382/166 |
| 6,522,418 B2 * | 2/2003 | Yokomozo et al. | 358/1.15 |

* cited by examiner

*Primary Examiner*—Andrew W. Johns
*Assistant Examiner*—Shervin Nakhjavan
(74) *Attorney, Agent, or Firm*—McNair Law Firm, P.A.; Douglas W. Kim (57) ABSTRACT

This invention is directed to a remote press proofing system allowing a digital image to be transmitted from an originating site to a remote site, modifying the digital image, color correcting the digital image, and comparing the color space of the digital image with the color space of an output device, so that the client may view a color corrected digital image and make modifications in order to approve whether the quality and color of the sample is sufficient without having to physically travel to the printer's location.

26 Claims, 7 Drawing Sheets

REMOTE PRINT PRESS PROOFING SYSTEM

The application is a continuation-in-part to application Ser. No. 09/726,922, filed on Nov. 30, 2000, now U.S. Pat. No. 6,381,343, which, in turn, claims priority on Ser. No. 60/195,688, filed on Apr. 7, 2000, incorporated by reference.

FIELD OF THE INVENTION

This invention is directed to a computerized system and method for online calibration of digital images and, more particularly, to a computer system having the ability to transmit a color managed digital image from an originating location to a remote location so that a remote viewer can view or modify a color correct digital representation of an image.

BACKGROUND OF THE INVENTION

In the printing industry, it is common for a press check to be conducted to ensure that the print run meets the specifications of the client. The purpose of a press check is to ensure that the color, type, and other appearances are satisfactory to the client. This process is very important since printing runs can be in excess of 100,000 copies. Considerable time, effort, and money are wasted if a print run of a large number of copies is made and the client subsequently rejects the quality of the copies. Traditionally, the client physically travels to the printer's location in order to perform a press check. This requires that the client spend time and money, as well as, requires the client and the printer to coordinate the session so that neither party will wait on the other. When a print job necessitates multiple runs, the print check process is performed prior to each run requiring a waiting period between press checks. Since a run of 40,000 copies may require hours, the client must wait for the run to be completed before the client is able to perform a press check on a second run. Since most clients are designers whose time is at a premium, there are significant inefficiencies in the present system that much attention should be directed. Once the designer does meet with the printer, the proof is run, physical charges are made to the proof and the proper adjustments to the printing machine are made according to the changes by the designer. Again, a proof is produced and the process is repeated. According to this method, there are several physical proofs that have physical notations showing the changes by the designer for each iteration of proofs. By reviewing each physical proof in order of their creation, a history of the changes or modifications can be viewed. This benefit should be included with attempts to correct the inefficiencies of the present procedures above.

Accordingly, it is an object of the present invention to provide a proofing system that alleviates the need for the client to physically travel to the printer's location.

Additionally, it is an object of the present invention to provide a press proofing system that allows the client to view a color corrected digital image from the convenience of the client's location.

It is yet another object of the present invention to provide a remote proof system that can record the iterations of a press check session to record the various changes or modifications to the image.

SUMMARY OF THE INVENTION

The above objectives are achieved by providing a press proofing system for providing a color managed digital image from an originating site to a remote site for viewing by a viewer comprising: an image server having a computer readable medium; a network connection for allowing communications between the image server and a network; at least one processor contained within the image server in communication with the computer readable medium; a set of computer readable instructions contained within the computer readable medium, that when executed by the processor, to perform the steps of creating a first set of digital information representing a first digital image, receiving modification instructions for creating a second set of digital information representing a second digital image reflecting modifications to the first digital image, and allowing the viewer to view the differences between the first set of digital information and the second set of digital information so that the viewer is provided with the history of modifications. Additionally, the invention can include instructions for formatting the first set of digital information into a plurality of layers of differing resolutions so that each layer can be transmitted to the remote site based upon the viewer's requested magnification to efficiently and quickly allow the viewer to view the first or second digital image. The set of computer readable instructions can include compression instructions for compressing the first or second set of digital information within at least one of the layers so that storage of the layers requires less space within the computer readable medium. Each layer can contain at least one tile. Further, the invention can include a set of output color space information embodied within the computer readable medium representing the color space of the output device; and, a set of computer readable gamut instructions for calculating the digital image color space of the second digital image, comparing the digital image color space with the set of output color space information, determining whether the digital image color space falls within the output color space, and providing the results of the determination to show whether the output device will reproduce the colors of the digital image. The results of the determination can also be presented in a graphical format.

The set of computer readable instructions can also include receiving instructions for receiving output device color profile information, modifying the first or second set of digital information according to the output device color profile information so that the first or second set of digital information emulates changes to the output device were changes to be made to the output device's properties. The invention can also have a video camera that can be connected to the image server; and, a set of video instructions contained within the computer readable medium to captured video information via the video camera for transmission to the remote site. The video instructions, whether at the server or remote site, can include instructions for storing the video image within the computer readable medium. Additionally, a microphone can be connected to the image server or remote site. A set of audio instructions can be contained within the computer readable medium of the image server or remote site that capture audio information via the microphone for transmission to the remote site. The audio instructions can include instructions for storing the audio information within the computer readable medium.

This invention can also include a first color calibrated monitor connected to the image server for displaying a first digital image represented by a first set of digital information; at least one remote terminal having a computer readable medium connected to the network for transmitting image requests to the image server and receiving responses from the image server; a second color calibrated monitor connected to the remote computer for allowing digital images viewed on the first and second monitors to be color matched within a predetermined tolerance and a set of computer readable image server instructions being stored within the computer readable medium of the image server for displaying the first digital image on the first color calibrated monitor from at least a portion of the first set of digital information, transmitting at least a portion of the first set of digital information to the remote site for viewing, receiving modification instructions for creating a second set of digital information representing a second digital image reflecting modifications to the first digital image; and transmitting at least a portion of the second set of digital information to the remote site for viewing.

Additionally, the invention can include a set of computer readable remote instructions stored within the computer readable medium of the remote computer for sending an image request to the image server; receiving at least a portion of the first set of digital information representing the requested resolution, and displaying a digital image on the second color calibrated monitor based upon the portion of the first set of digital information so that the displayed image is color matched within a predetermined tolerances of the digital image displayed on the first monitor. A set of computer readable remote instructions stored within the computer readable medium for receiving at least a portion of the second set of digital information representing the requested resolution, and displaying the second digital image on the second color calibrated monitor based upon the portion of the second set of digital information so that the displayed image is color matched within predetermined tolerances of the digital image displayed on the first monitor can be included. The remote instructions can include decompression instructions for decompressing the transmitted digital information in the compressed format.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF A PREFERRED EMBODIMENT

The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result. These steps require physical manipulations of physical quantities such as electrical or magnetic signals capable of being stored, transferred, combined, compared, or otherwise manipulated. An object or module is a section of computer readable code embodied in a computer readable medium that is designed to perform a specific task or tasks. Actual computer or executable code or computer readable code may not be contained within one file or one storage medium but may span several computers or storage mediums. The term "host" and "server" may be hardware, software, or combination of hardware and software that provides the functionality described herein.

The present invention is described below with reference to flowchart illustrations of methods, apparatus ("systems") and computer program products according to the invention. It will be understood that each block of a flowchart illustration can be implemented by a set of computer readable instructions or code. These computer readable instructions may be loaded onto a general purpose computer, special purpose computer, or other programmable data processing apparatus to produce a machine such that the instructions will execute on a computer or other data processing apparatus to create a means for implementing the functions specified in the flowchart block or blocks.

These computer readable instructions may also be stored in a computer readable medium that can direct a computer or other programmable data processing apparatus to function in a particular manner, such that the instructions stored in a computer readable medium produce an article of manufacture including instruction means that implement the functions specified in the flowchart block or blocks. Computer program instructions may also be loaded onto a computer or other programmable apparatus to produce a computer executed process such that the instructions are executed on the computer or other programmable apparatus provide steps for implementing the functions specified in the flowchart block or blocks. Accordingly, elements of the flowchart support combinations of means for performing the special functions, combination of steps for performing the specified functions and program instruction means for performing the specified functions. It will be understood that each block of the flowchart illustrations can be implemented by special purpose hardware based computer systems that perform the specified functions, or steps, or combinations of special purpose hardware or computer instructions. The present invention is now described more fully herein with reference to the drawings in which the preferred embodiment of the invention is shown. This invention may, however, be embodied any many different forms and should not be construed as limited to the embodiment set forth herein. Rather, these embodiments are provided so that this disclosure will be thorough and complete and will fully convey the scope of the invention to those skilled in the art.

Figure 1:
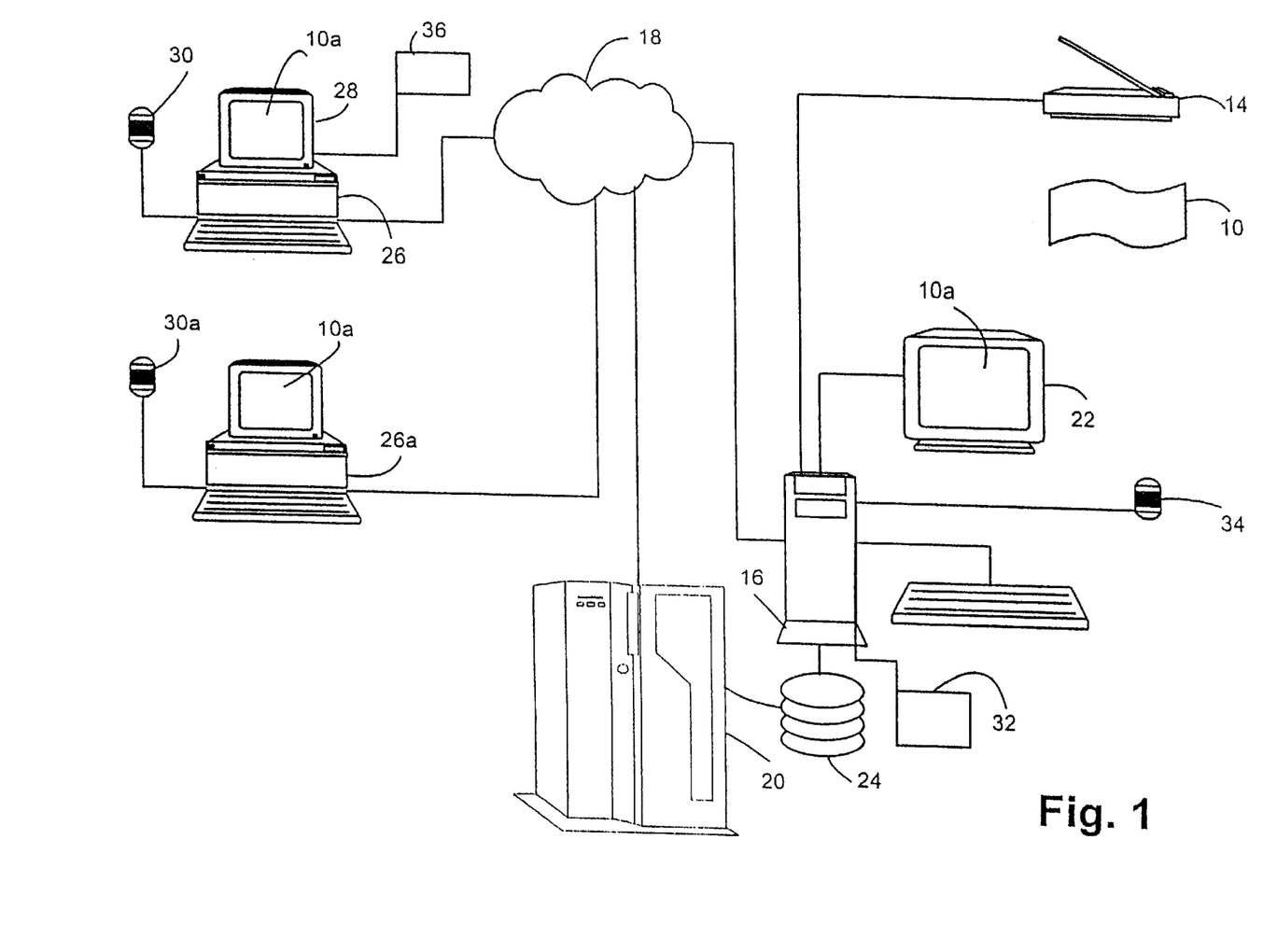
FIG. 1 is a schematic of the invention connected to a network.

In FIG. 1, a physical sample 10 is digitized by a digitizing device 14 which can be a scanner, camera, camera scan back, or other digitizer, is connected to an image server 16 for creating digital image information representing a physical sample. Once images created or captured, they can be either stored on the image server 16 or sent through a network 18 to a host 20. Additionally, the computer represented as 16 in FIG. 1 may merely be a terminal for accessing an image server that could be represented as 20 in an alternative embodiment. Regardless of the physical representation of the image server, software on the image server and color-calibrated monitor 22 allow a digital image 10a to be displayed based upon captured digital information representations sample 10 so that the displayed image and the physical sample appear alike within prescribed tolerances.

In order to provide consistency between the digital images viewed by the printer and the client, the monitors at the printer's site or image server or originating site and the remote site, or client site can be color-calibrated to be color-matched within a proscribed tolerance.

Software included within the computer readable medium of the image server is capable of receiving a color profile associated with the digitizing device to assist in manipulating the digital information displayed so that an as near as possible color correct digital image is provided. Prior to digitizing the physical sample, such as a press proof sheet, the digitizing device is profiled so that the image server is aware of the specific color characteristics of the digitizing device. The goal is to reduce or eliminate colorcast and other imperfections that may be included in the digital information derived from the digitizing device. Color profiling can be derived from specifications by the International Color Consortium (ICC) in its profile format. This format provides a cross platform device profile format used to translate color data created by one device into another device's native color space. Hardware and software using this profile has the ability to create profiles as defined by the ICC standard. ICC conforming software can be used to satisfy the ICC requirements. Further information can be found from the ICC.1:1998-09 specification for file format for color profiles. Those skilled in the art would incorporate these profiles into software to provide color profiles for various hardware. Additionally, the software allows for the manipulation of the digital information so that the displayed digital image can be changed to both view proposed changes to the image such as color, hue, brightness and other characteristics as well as to emulate what the physical changes to the printing press may do to the physical sample or press proof subsequently created. Printing press profile information is used to adjust or manipulate the digital information to provide a virtual printing press change.

A client wishing to utilize this system can access image server 16 through a remote or client computer 26 that is also connected to network 18. A color-calibrated monitor 28 is also connected to the client computer. The client is able to retrieve digital information representing the physical sample and have a digital image 10a displayed on client monitor 28. Since image server monitor 22 and client monitor 28 are color calibrated, the client is able to see the same color correct image of sample 10 at the client monitor as at the image server monitor within prescribed tolerances. Once the image is retrieved, the client may wish to communicate with the printer by speaking into a client microphone 30 so that voice data can be transmitted through network 18 to at least on printer speaker 32 located on image server 16. The printer can respond to the client's comments through microphone 34 which captures audio information for transmission through network 18 to at least one client speaker 36. Since digital image information 10a is stored in a computer readable medium 24 included with local digital image server 16 or central image server 20, multiple client sites can retrieve digital image information for viewing the same digital image at the same time. For example, a client using client computer 26a may also view digital image 10a as well as provide comments or request corrections to the image viewed through a second's microphone 30a. In order to facilitate the press checking session, audio and video data can be transmitted to and from the printer's site and the client's site to provide for a virtual conference to discuss the session. This audio and video information can also be recorded along with the changes to the virtual proof for later review.

During a print proofing session, the client may wish for different areas of the sample to be viewed and/or zoomed in and out by requesting various magnifications to specific areas of the digital image. This allows the client to inspect and comment upon particular areas of the digital image and ultimately the physical sample. Therefore, it is advantageous to format the digital information initially captured into multiple layers within a computer readable file with each layer representing a different resolution of the digital image. This allows for only a specific layer to be transmitted responsive to a requested magnification of the digital image data to quickly and efficiently display to the viewer a virtual press proof. Additionally, each layer can be broken down into tiles to further refine the ability to quickly and efficiently transmit the least amount of data for each requested magnification. Both layers and tiles can be stored in a compressed format and decompressed by the image server or remote computer prior to viewing the digital image. Additionally, each layer can be comprised of at least one tile that represent a portion of the digital information representing a portion of the physical sample. This format allows for the transmission of digital image data of high resolution across a network without significant bandwidth requirements since a typical press proof is approximately 28" by 40" in dimension.

Figure 2:
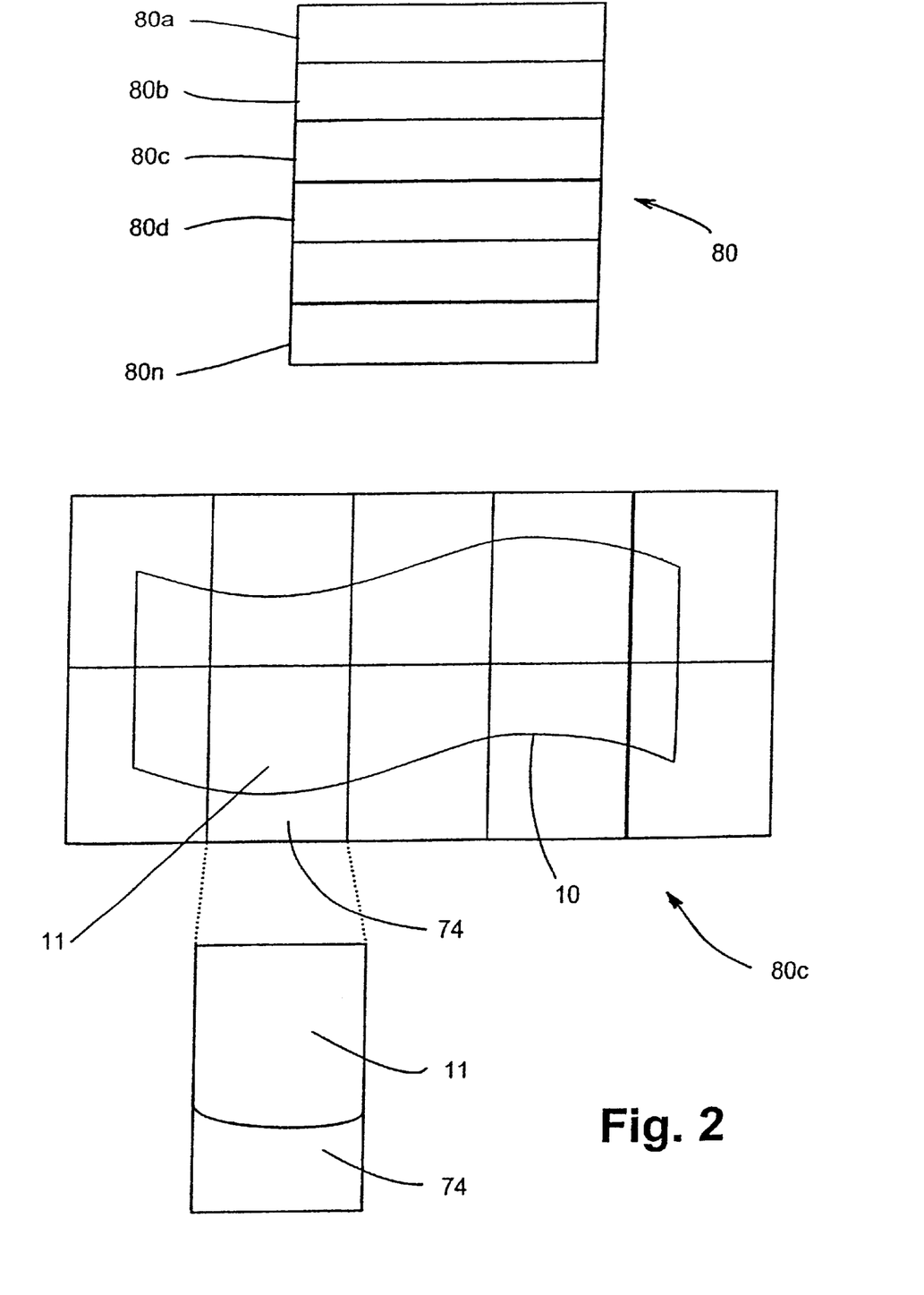
FIG. 2 is a flow diagram of the steps and data transmitted between the origination site and the client site.

Referring now to FIG. 2, a diagram illustrating a typical file format 80 is further shown. An initial section 80a contains file identification information such as header information and characteristics of the file including number of layers, compression rates, tile size, and other such administrative information. Layer 80b can include "raw" image information that is uncompressed so that the relationship between the pixel represented in the layer and the pixels of the image is 1 to 1. This layer is typically coined layer zero and is one-hundred percent resolution. Layer 80c can then have a more compressed representation of the physical sample. For example, the pixels of this layer may represent two pixels of layer zero providing for a more compressed representation of the physical sample. A Layer N illustrated as 80n ,ay contain sufficient compression as to allow for the entire physical image to be displayed on the available pixels of a viewing screen. It should be noted that generally, layer zero is of a size that display on a typical viewing screen of the entire physical sample representation is not possible. By dividing the layers into tiles, increased efficiency is obtained through transmission between the stored image information to a viewing screen in that the information can be transmitted tile by tile rather than the entire image at a time. Therefore, when a client selects a specific magnification and wishes to see sample portion 11 with this magnification, the digital information contained in tile 74 is sent from the image server to the client's computer without having to transmit the entire file. As such, the significantly reductions are achieved in the amount of data transmitted, the amount of bandwidth required, and the transmission time needed for displaying the sample portion 11 on the client's or image server's monitor. The physical manipulation and resulting advantages for managing tiles are contained within computer readable code on the image server and provide for a layer and tile manager set of computer readable instruction.

Figure 3:
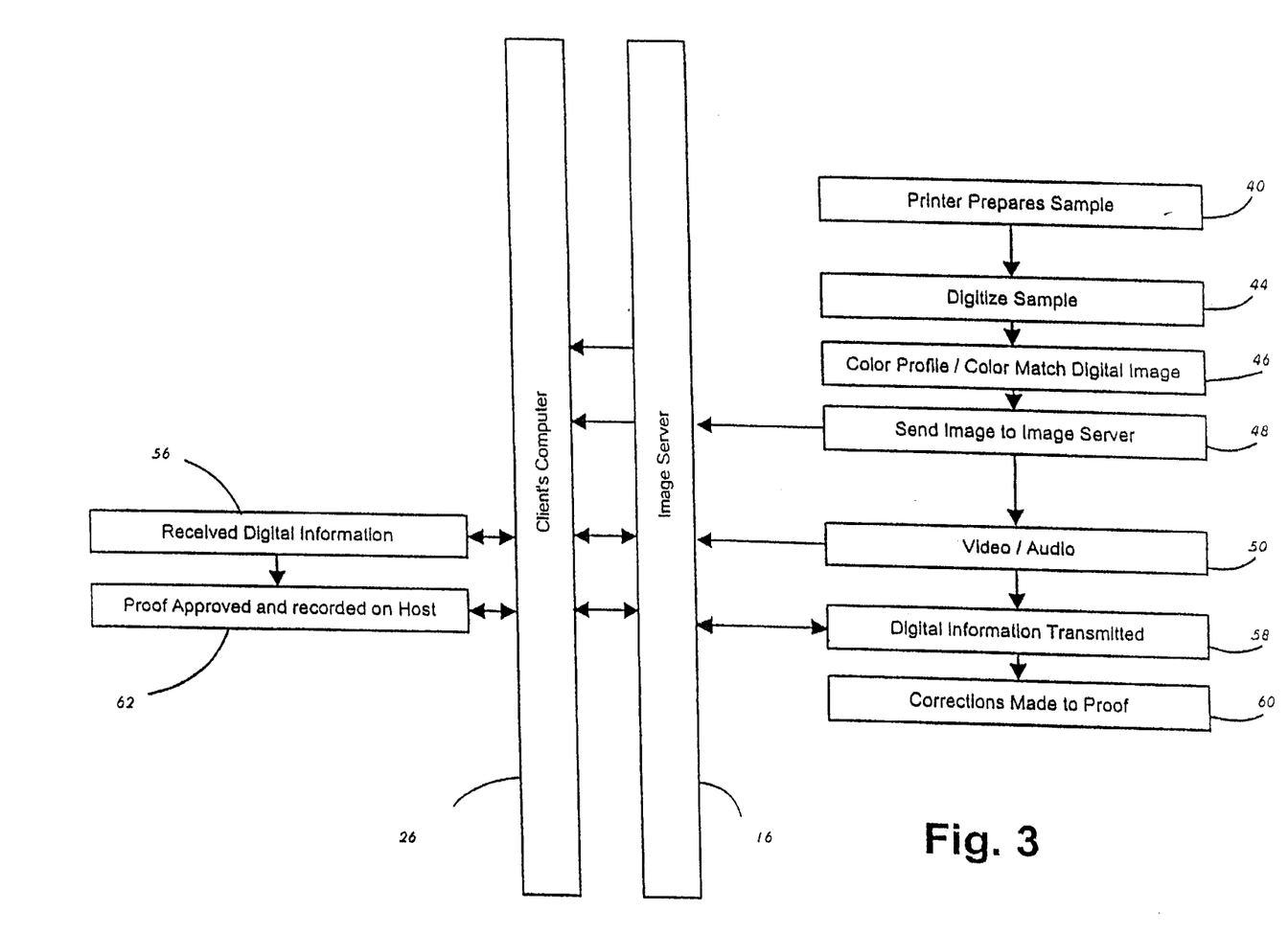
FIG. 3 is a schematic of data signal transmissions between the origination site and the client site.

Referring now to FIG. 3, the steps taken during a press proofing session is further illustrated. The first step in this process is where the printer prepares the sample of the press proof in step 40. Next, the sample is digitized for producing digital information representing a still image of the sample using digitizing device 14 in step 44. The image is then color matched using software, color profiling of the digitizing device, and environmental readings through image server 16 so a digital image displayed on the image server is color matched within a prescribed tolerance of the physical sample in step 46. The digital information image may then be sent to central image server 20 when the specific embodiment requires the image server physically separated from the printers' terminal in step 48. When video information or audio information is captured for transmission to the remote site, the transmission is initiated in step 50. In step 58, the client is provided with digital information representing the physical sample for display of a digital image. The client receives the digital information and can display the digital image from this information in step 56. When the client requests a change to the digital image, the printer can manipulate the digital information for redisplay in step 60. At some point the client may approve the proof and this approval is recorded in step 62. The recordation of approval is available for future review to the image server.

Figure 4:
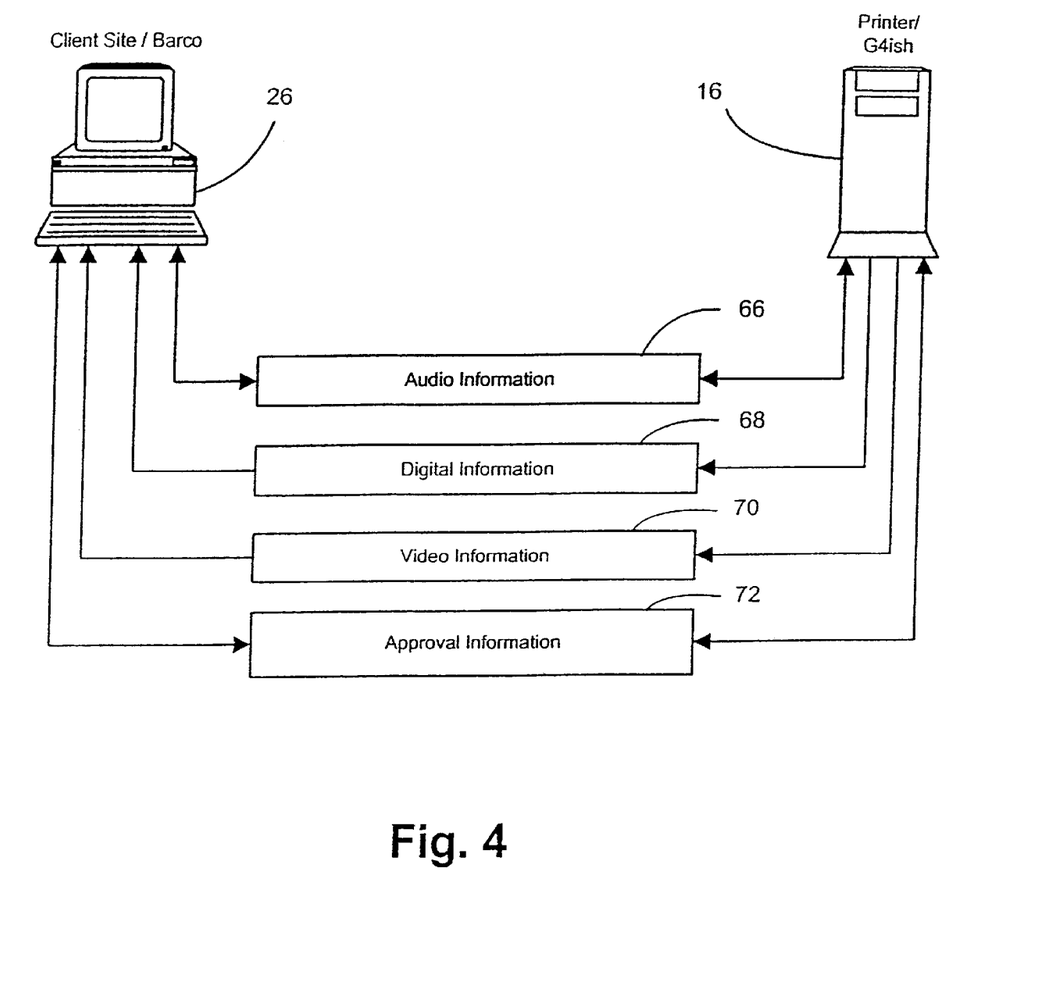
FIG. 4 is a schematic of a file format of storing digital images.

Referring now to FIG. 4, the image server can be further illustrated. In one embodiment of this system, it is advantageous to record the session between the printer and the client in order to preserve the interaction between the parties and especially to have a record of the contemplated changes to the press proof. Therefore, the image server or central host have the ability to capture the data transmissions between the printer and the client for storing audio information 66 between the printer's and client's terminal, the digital information 68 including changes to the digital images, video conferencing information 70 between the printer and the client, and approval information form the client 72. This information can be recorded, copied to a transportable medium, archived, sent to the client, or sent to the printer. As well as the above stored information, the system can track other characteristics of the session for such purposes as accounting. For example, the time elapsed during the press proof session, the amount of data transmitted from the printers to the clients, the number of still images transmitted, and the number of clients connected to a printer. Such information is advantageous for invoicing the printer, the client, or both for use of the system.

Figure 5:
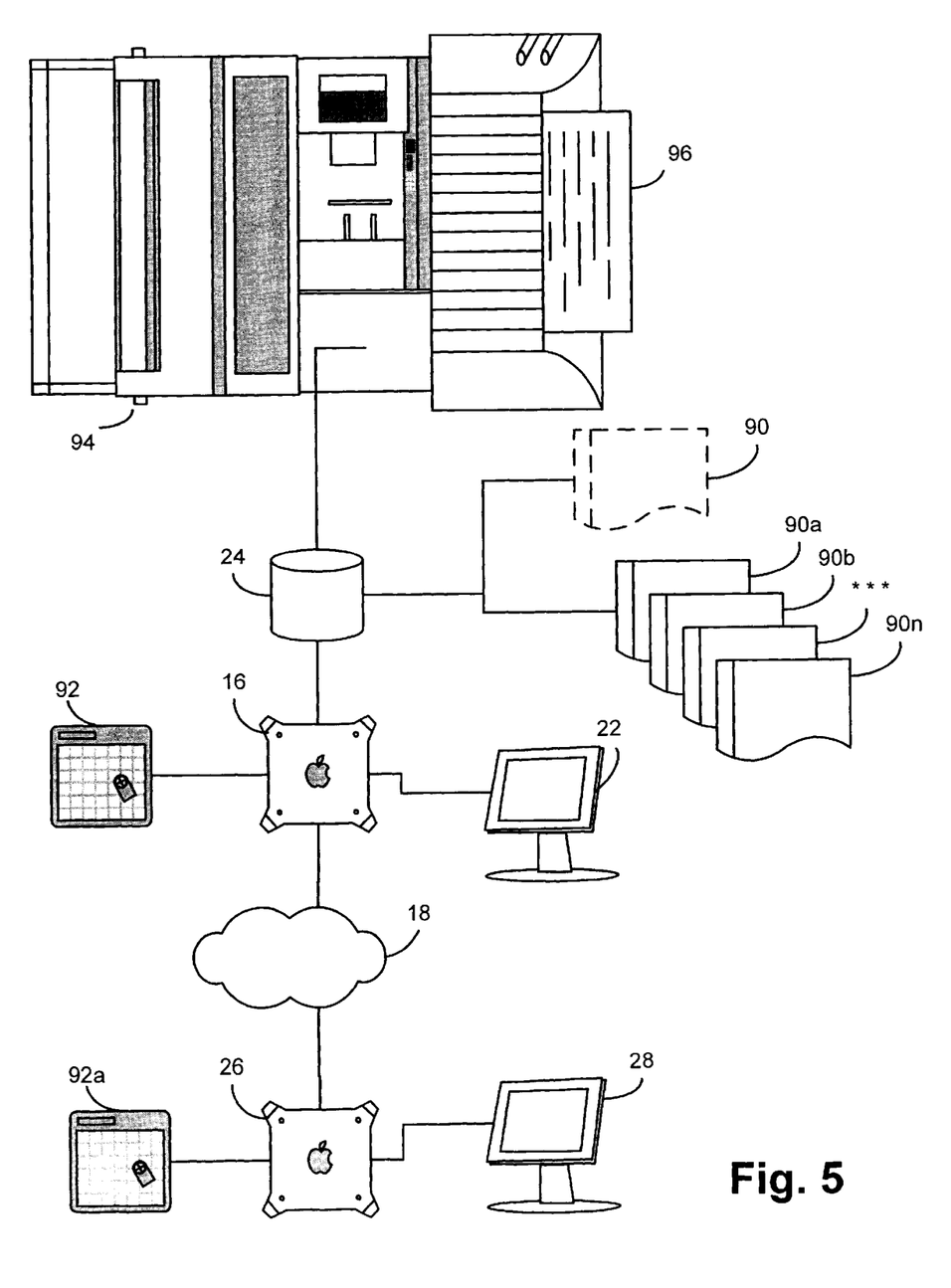
FIG. 5 is a schematic of the invention.

Referring now to FIG. 5, an alternative application of this invention is shown. Given the modernization of technology, many images are created in the digital environment. Therefore, a digital image 90 is originally created at image server or originating site 16. Digital information representing the digital image is stored in computer readable medium 24. The image can be edited through editing device 92 which includes keyboards, mouse controls, touch screens, digitizing pads, voice command, or other input means. When the image is first created, a first set of digital information represents the first digital image. Upon modification, a second set of digital information is created representing a second digital image. For purposes of this application, the term first digital image refers to a first set of digital information that, once modified, can become a second set of digital information. Therefore, a first and second version of a digital file can be made. It should be understood that the first set of digital information need not be the initially created set of digital information, but can represent a digital image prior to modification to a second digital image. Server monitor 22 can be used to view and assist with the creation or modification of the digital image. Once digital image 90 is created, it can be transmitted to print machine 94 to produce a physical copy 96 of the digital image. Advantageously, prior to submitting the digital image to the printer, the image can be sent to client computer 26 having monitor 28 and client editing device 92a through network 18. Therefore, a proofing session can be conducted to allowing a client to review the digital image prior to actually producing the final physical copies.

Unfortunately, the end results of the above process leave only the final modified digital image without the benefit of being able to view the history of charges. Therefore, for each modification made for iterations to the image file performed by the originator or client, the computer readable instructions of this invention can store various iterations in the computer readable medium of the invention. Once digital image 90 has been created, changes to the image can be made from server 16 or client computer 26. Therefore, a second version of the digital image 90a is produced. The second version includes the changes made to the first version.

When changes are made to the second version, thereby producing a third version, these are also recorded and stored. Again, for purposes of terminology, the "first" set of digital information could be the first or second version with the second set of digital information being the second or third version. Therefore, the subsequent versions 90a through 90n representing n versions can be reviewed, restored, and compared to provide a history of changes or modifications to the original digital image. This process allows the proofing session to take place without having to rely upon physical samples from the printer but also allows the recordation of changes or modifications for each iteration of the digital file.

Since the process described above does not rely upon the production of a physical print, there is the risk that the color space of server 16, monitor 2a or editing device 92, are not contained within the color space of print machine 94. Therefore, the creator of the digital image may not be able to physically reproduce the digital image with print machine 94. Accordingly, this invention allows for the determination of what colors are reproducible by print machine 94, or any output device, to be stored in the computer readable medium and compared with the color space of the digital image to determine if any colors of the digital image are not reproducible by the print machine. The invention allows the digital image to be modified so as to fall within the color space of the print machine, or other output device, to prevent discrepancies with a physical representation of the digital image due to discrepancies between the color space of the digital image and output device.

Figure 6:
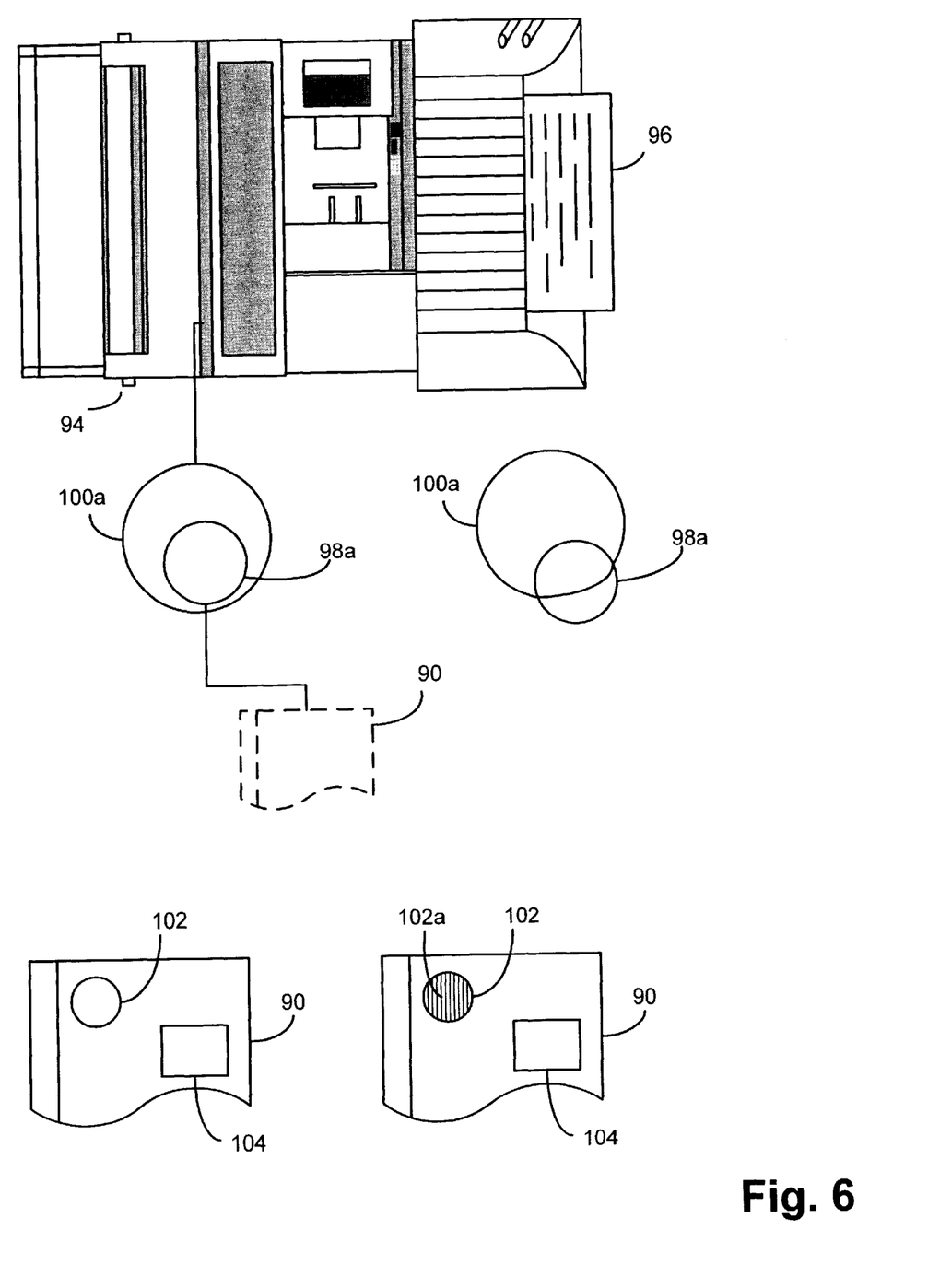
FIG. 6 is a schematic of components of the invention.

Referring now to FIG. 6, the gamut feature of this invention is described in more detail. When digital image 90 is created, it may have color space 98a. Print machine 94 has color space 100a. As can be seen, digital image color space 98a is contained within color space 100a and, therefore, should be able to be reproduced. Therefore, the computer readable instructions of this invention can illustrate that there should be no color space discrepancies. However, is the digital image has digital image color space 98b, this color space falls outside print machine color space 100a and will not be properly reproduced. Therefore, the computer readable instructions can graphically illustrate or otherwise indicate that some colors of the digital image are not properly reproducible. While digital image 90 shows elements 102 and 104, a comparison of the print machine's color space and the digital image color space shows that element 102a is not properly reproducible by the print machine by adding indicia 102a to element 102. The digital image can now be edited so as to properly place the color space of image 90 within the color space of print machine 94.

Figure 7:
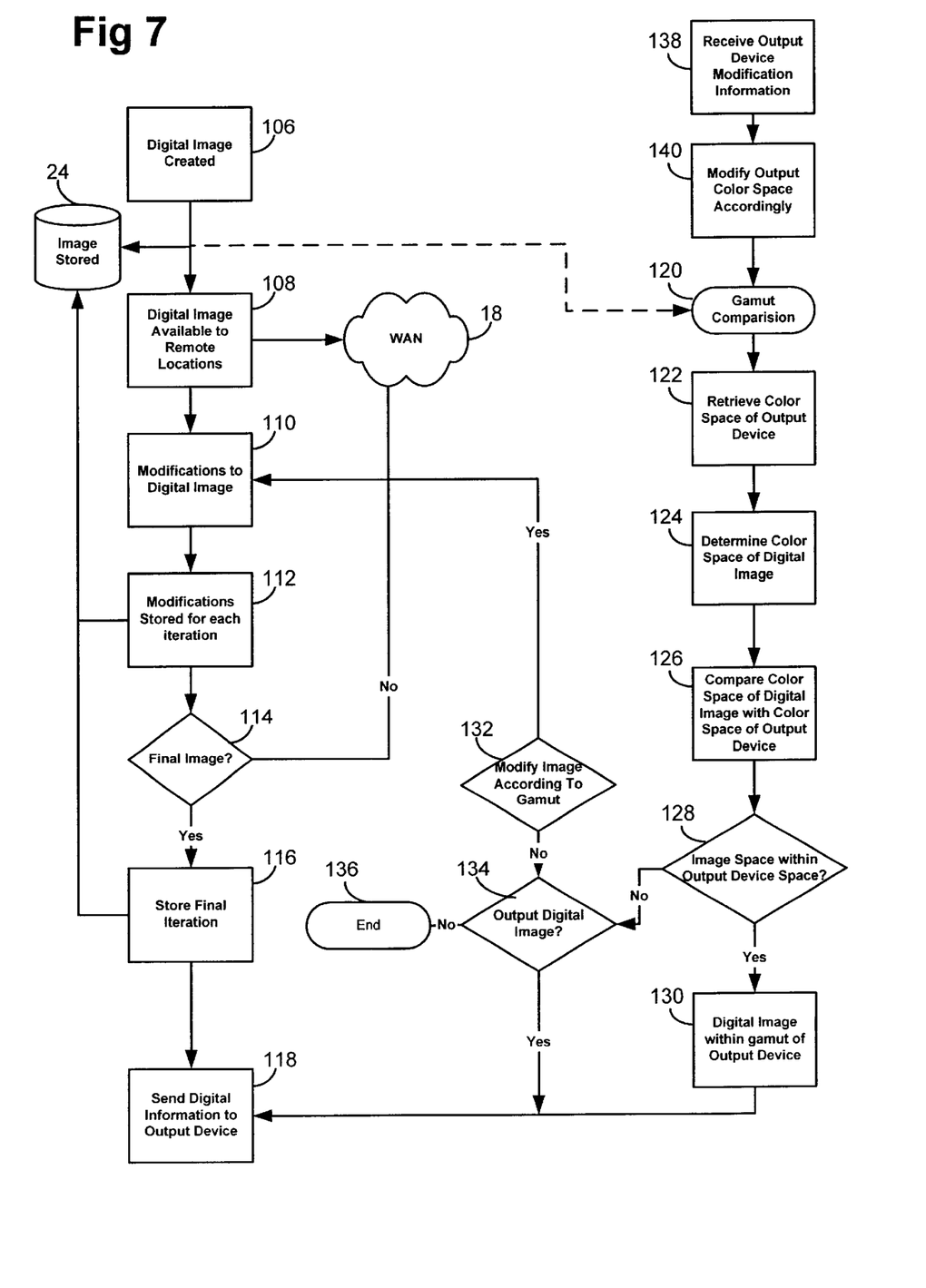
FIG. 7 is a flowchart of the invention.

Referring now to FIG. 7, the processes of this invention are explained in further detail. A first digital image is created in step 106 and stored in computer readable medium 24. A first set of digital information stored in the computer readable medium represents the first digital image. Once created, the digital image is available at both the originating site as well as a remote location site as shown in step 108. The image can be retrieved from computer readable medium 24 across wide area network 18 so as to be accessible by remote sites. Once digital information representing the digital image is retrieved at a remote site, it may be necessary to modify the digital image in Step 110 according to the requirements of a client or other parameters affecting the digital image. In this case, modification instructions are received during step 110 and modifications are made to the digital information representing the digital image. These modifications are stored for each iteration in step 112 so that it is possible to determine what modifications were made between the first digital image and the second digital image. The modification history can be retrieved by either the originating site or the remote sites for review. A determination is made in step 114 as to whether a final image has been completed and, if so, a final image is stored in step 116. In the event that a final image has not been created, it may be necessary to modify the digital image and the process returns to step 110. Once a final image has been created, the digital information is sent to the output device in order to produce a physical or production copy of the digital image. A gamut comparison may be requested in step 120 at any point. In the event a gamut comparison is requested, the color space of the output device, which has previously been stored, is retrieved in step 122. A calculation is made to discover the color space of the digital image in step 124. A comparison is made between the color space of the digital image and the color space of the output device in step 126. In step 128, a determination is made as to whether the image color space is within the output device color space and, if so, then the digital image is within the gamut of the output device and should be able to be reproduced with the colors producible by the output device. However, if the color space of the image falls outside the color space of the output device, then a determination is made in step 132 as to whether to modify the digital image and its digital information so as to fall within the color space of the output device. If so, then modifications can be made in step 110 and the process can continue from there. If the selection is made not to modify the digital information representing the digital image, then the digital information can then be sent to the output device for reproduction or the process can simply end in step 136.

Additionally, the color space information of the output device can be modified in step 140 according to received modification information in step 138. This allows any changes to the properties of the output device to be reflected in the color space information of the output device to provide the gamut comparison described above.

While a preferred embodiment of the invention has been described using specific terms, such description is for illustrative purposes only. It is to be understood that changes and variations may be made without departing from the spirit or scope of the following claims.

What is claimed is:

1. A virtual press proofing system for providing a color managed digital image from an originating site to a remote site for viewing by a viewer comprising:
   an image server having a computer readable medium;
   a network connection for allowing communications between said image server and a network;
   at least one processor contained within said image server in communication with said computer readable medium;
   a set of computer readable instructions contained within said computer readable medium, that when executed by said processor, said set of instructions causes said processor to perform the steps of creating a first set of digital information representing a first digital image, receiving modification instructions for creating a second set of digital information representing said first digital image plus modifications to said first digital image, and allowing the viewer to view the differences between said first set of digital information and said second set of digital information so that the viewer is provided with the history of modifications for each iteration of modifications performed on said first digital image.

2. The system of claim 1 wherein said set of computer instructions include instructions for formatting said first set of digital information into a plurality of layers of differing resolutions so that each layer can be transmitted to the remote site based upon the viewer's requested magnification to efficiently and quickly allow the viewer to view the first digital image.

3. The system of claim 2 wherein said set of computer readable instructions include compression instructions for compressing said first set of digital information within at least one of said layers so that storage of said layers requires less space within said computer readable medium.

4. The system of claim 2 wherein each layer contains at least one tile.

5. The system of claim 1 wherein said set of computer readable instructions include instructions for formatting said second set of digital information into a plurality of layers of differing resolutions so that each layer can be transmitted to the remote site based upon the viewer's requested magnification to efficiently and quickly allow the viewer to view the second digital image.

6. The system of claim 5 wherein said set of computer readable instructions include compression instructions for compressing said second set of digital information within at least one of said layers so that storage of said layers requires less space within said computer readable medium.

7. The system of claim 5 wherein each layer contains at least one tile.

8. The system of claim 1 including:
   a set of output color space information embodied within said computer readable medium representing the color space of an output device for outputting said digital images; and,
   a set of computer readable gamut instructions for calculating the digital image color space of said second digital image, comparing the digital image color space with said set of output color space information, determining whether the digital image color space falls within the output color space, and providing the results of said determination to show whether the output device will reproduce the colors of the digital image.

9. The system of claim 1 wherein said set of computer readable instructions include receiving instructions for receiving output device color profile information, modifying said second set of digital information according to said output device color profile information so that said second set of digital information emulates changes to the output device were changes to be made to the output device's properties.

10. The system of claim 1 wherein said set of computer readable instructions include receiving instructions for receiving output device color profile information, modifying said first set of digital information according to said output device color profile information so that said first set of digital information emulates changes to the output device were changes to be made to the output device's properties.

11. The system of claim 1 including:
a video camera connected to said image server; and,
a set of video instructions contained within said computer readable medium so that when said processor executes said instructions, a video image is captured by said video camera for transmission to the remote site.

12. The system of claim 11 wherein said video instructions include instructions for storing said video image within said computer readable medium.

13. The system of claim 1 including:
a microphone connected to said image server; and,
a set of audio instructions contained within said computer readable medium that, when executed by said processor, audio information is captured by said microphone for transmission to the remote site.

14. The system of claim 13 wherein said audio instructions include instructions for storing said audio information within said computer readable medium.

15. A virtual proofing system for providing color managed digital images from an origination site to at least one remote site comprising:
an image server having, a processor, a computer readable medium and connected to a network;
a first color calibrated monitor connected to said image server for displaying a first digital image represented by a first set of digital information;
at least one remote terminal having a computer readable medium connected to said network for transmitting image requests to said image server and receiving responses from said image server;
a second color calibrated monitor connected to said remote computer for allowing digital images viewed on said first and second monitors to be color matched within a predetermined tolerance; and,
a set of computer readable image server instructions for being stored within said computer readable medium of said image server for displaying said first digital image on said first color calibrated monitor from at least a portion of said first set of digital information, transmitting at least a portion of said first set of digital information to the remote site for viewing, receiving modification instructions for creating a second set of digital information representing said first digital image plus modifications to said first digital image; and transmitting at least a portion of said second set of digital information to the remote site for viewing.

16. The system of claim 15 including a set of computer readable remote instructions stored within said computer readable medium of said remote computer for sending an image request to said image server; receiving at least a portion of said first set of digital information representing the requested resolution, and displaying a digital image on said second color calibrated monitor based upon said portion of said first set of digital information so that said displayed image is color matched within a predetermined tolerances of the digital image displayed on said first monitor.

17. The system of claim 15 including a set of computer readable remote instructions stored within said computer readable medium for receiving at least a portion of said second set of digital information representing the requested resolution, and displaying said second digital image on said second color calibrated monitor based upon said portion of said second set of digital information so that said displayed image is color matched within predetermined tolerances of the digital image displayed on said first monitor.

18. The system of claim 15 wherein said set of computer readable image server instructions include instructions for formatting said second set of digital information in a plurality of layers with each layer representing differing resolutions.

19. The system of claim 18 wherein said computer readable image server instructions include instructions for storing said layers in a compressed format and transmitting said digital information in said compressed format; and,
said remote instructions include decompression instructions for decompressing said transmitted digital information in said compressed format.

20. The system of claim 15 including:
a video camera connected to said image server for capturing video data at the image server site;
a set of video instructions contained in said computer readable medium of said image server for receiving said video data from said video camera and transmitting said video across said network;
a set of remote video instructions embodied in said computer readable medium of said remote computer for receiving said video data over said network from said image server and displaying said video information on said second monitor.

21. The system of claim 20 including a video display connected to said remote computer for displaying said video information received from said image server.

22. The system of claim 15 including:
a microphone connected to said image server for capturing audio information at the image server site;
a set of audio instructions contained in said computer readable medium of said image server for receiving said audio information and transmitting said audio information across said network;
at least one speaker connected to said remote computer for outputting audio information; and,
a set of remote audio instructions contained within said computer readable medium of said remote computer for said receiving said audio data from said image server over said network and outputting said audio data through said at least one speaker.

23. A system for determining the reproducible colors of a digital image by an output device comprising:
a computer readable medium;
a set of output color space information embodied within said computer readable medium representing the color space of the output device;
a set of computer readable gamut instructions embodied within said computer readable medium for retrieving said set of output color space information, calculating the color space of the digital image, comparing the color space of the digital image with said set of output color space information, determining whether the color space of the digital image falls within the output color space, adding graphical indicia to the digital image indicating any areas on the digital image falling outside the set of output color space information and providing the results of said determination to show whether the output device will reproduce the colors of the digital image.

24. The system of claim 23 wherein said computer readable gamut instructions include instructions for providing the results of said determination in a graphical format.

25. The system of claim 23 wherein said computer readable gamut instructions include instructions for storing said determination in a said computer readable medium.

26. The system of claim 23 wherein said set of computer readable gamut instructions include instructions for receiving output device modification instructions representing the changes made to the output device's properties and modifying said set of output color space information according to said output device modification instructions to reflect changes to the properties of the output device.

* * * * *